United States Patent [19]

Goodall

[11] Patent Number: 4,563,512

[45] Date of Patent: Jan. 7, 1986

[54] OLEFIN POLYMERIZATION PROCESS UTILIZING A COMBINATION OF SELECTIVITY CONTROL AGENTS

[75] Inventor: Brian L. Goodall, Houston, Tex.

[73] Assignee: Shell Oil Company, Houston, Tex.

[21] Appl. No.: 584,416

[22] Filed: Feb. 28, 1984

[51] Int. Cl.$^4$ .................................................. C08F 4/02
[52] U.S. Cl. .................................... 526/125; 526/141; 526/142; 526/348.6; 526/351; 502/123; 502/126
[58] Field of Search ............ 526/125, 141, 142, 348.6, 526/351; 502/123, 126

[56] References Cited

U.S. PATENT DOCUMENTS

| 4,211,670 | 7/1980 | Vandenberg | 526/141 |
| 4,309,521 | 1/1982 | Sato et al. | 526/142 |

*Primary Examiner*—Joseph L. Schofer
*Assistant Examiner*—Fred M. Teskin
*Attorney, Agent, or Firm*—Dean F. Vance

[57] ABSTRACT

In a polymerization of alpha mono-olefins by means of certain supported coordination catalysts systems which comprise (a) a procatalyst, (b) a cocatalyst, and (c) a selectivity control agent, wherein (a) is a highly active solid composition which comprises magnesium chloride, titanium tetrachloride and an electron donor; and (b) is an aluminum trialkyl; the selectivity control agent comprises a strong selectivity control agent and a weak selectivity control agent.

25 Claims, No Drawings

OLEFIN POLYMERIZATION PROCESS UTILIZING A COMBINATION OF SELECTIVITY CONTROL AGENTS

BACKGROUND OF THE INVENTION

1. Field of the Invention

This invention relates to a process for the polymerization of olefins using catalyst components comprising a magnesium halide and a titanium halide and a particular selectivity control agent composition.

2. Description of the Prior Art

Numerous proposals are known from the prior art to provide olefin polymerization catalysts by combining a solid component comprising at least magnesium, titanium and chlorine with an activating organoaluminum compound. These may be referred to as supported coordination catalysts or catalyst systems. The activity and stereo-specific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalyst of this type are disclosed in numerous patents. See, for example, U.S. Pat. Nos. 4,226,741, 4,329,253 and published European Patent Application No. 19,330. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components. Further, it is important that the resulting poly(alpha olefin) have other acceptable properties.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-paramethoxybenzoate (ethyl anisate). However, it has now been found that polymers made with ethyl anisate or pEA may have an objectionable licorice odor. Accordingly what is now needed is a selectivity control agent which performs as well or better than pEA but which does not impart a strong odor to the resulting polymer.

BRIEF DESCRIPTION OF THE INVENTION

This invention provides an improvement in polymerization of alpha mono-olefins by means of certain supported coordination catalyst systems which comprise (a) a procatalyst, (b) a cocatalyst and, (c) a selectivity control agent, wherein (a) is a highly active solid composition which comprises magnesium chloride, titanium tetrachloride, and an electron donor; (b) is an aluminum trialkyl; and (c) comprises a strong selectivity control agent and a weak selectivity control agent, said strong selectivity control agent being selected from the group consisting of aromatic esters and said weak selectivity control agent being selected from the group consisting of simple ethers or tertiary amines.

As is shown in the examples which follow, the combination of the two different type selectivity control agents results in higher selectivity (i.e., lower xylene solubles), improved crystallinity of the product, and, the need for substantially less (odor forming) ester as selectivity control agent. Further, there are additional possible advantages for using two different SCAs. One advantage is that it may be possible to control or vary molecular weight distribution at constant xylene solubles level. Currently, the cocatalyst/SCA ratio controls molecular weight distribution, but also controls xylene solubles level. By using relative different amounts of the weak SCA to strong SCA at certain cocatalyst levels, it may be possible to vary molecular weight distribution at constant xylene solubles. A second possible advantage for the present invention is that the ratio of weak SCA to strong SCA and selection thereof may be useful to control overall catalyst deactivation rate.

DETAILED DESCRIPTION OF THE INVENTION

The procatalysts which are employed in this invention may be produced by methods known in the art. These procatalysts are any one of the recently developed, high activity magnesium halide supported catalyst components disclosed e.g., in U.S. Pat. Nos. 3,953,414, 4,051,313, 4,115,319, 4,149,990, 4,211,339, 4,220,554, 4,226,741, 4,263,169, 4,329,253, 4,400,302 and 4,414,132, hereby incorporated in this application by reference.

A preferred procatalyst may be prepared by reacting a magnesium alkoxide, suitably magnesium diethoxide, with titanium tetrachloride in the presence of or with subsequent addition of an aromatic ester electron donor, preferably in the presence of and/or with subsequent treatment with a halohydrocarbon liquid, to produce a composition of combined tetravalent titanium chloride compounds, magnesium chloride and the electron donor, and further treating the resulting solid at an elevated temperature with titanium tetrachloride in one or more contacts.

These procatalysts have the general formula

wherein

R is an alkyl group of 2–8 carbon atoms or an aryl, alkaryl, or aralkyl group of 6 to 20 carbon atoms, preferably ethyl;

ED is an electron donor, preferably an aromatic ester;

x=5–40 and preferably 9–20;

y=10–100 and preferably 20–40;

z=0.02–1.0 and preferably 0.05–0.5; and a=0.5–10 and preferably 0.6–3.5.

A variety of electron donor compounds, disclosed in the prior art as useful in the preparation of supported coordination procatalysts may be employed as compound ED. Esters are preferred; aromatic esters are most preferred. Very good procatalysts can be made using ethyl benzoate as compound ED.

Cocatalysts used as component (b) with procatalysts are trialkyl aluminum compounds AlR'$_3$ wherein R' is an alkyl group of 2 to 8 carbon atoms, preferably ethyl. They may be complexed in whole or in part with the selectivity control agents of the present invention.

The present invention deals particularly with the use of two specific selectivity control agents (SCA). These two SCA are a strong SCA and a weak SCA.

The present invention resulted in part from a better understanding of the chemical interactions between cocatalyst and SCA. For example, when the cocatalyst is triethylaluminum (TEA) and the SCA is a strong SCA such as p-ethyl anisate (PEA), and one equivalent of TEA is present, the reversible Lewis acid-base adduct (I) is formed as shown below:

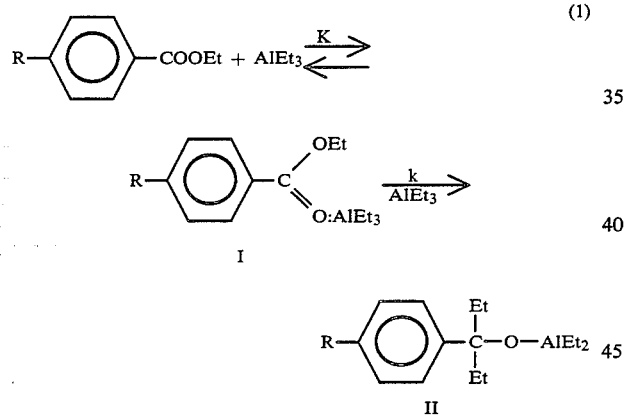

(1)

The presence of a second equivalent of TEA can lead to the irreversible formation of the alkylated product (II). The consequences of the alkylation reaction may be threefold:

1. Ester is consumed thereby leading to reduced selectivity.
2. TEA is consumed, thereby leading to reduced productivity.
3. Poisons are generated, thereby leading, perhaps, to a higher catalyst deactivation rate.

As shown in the examples which follow, a weak SCA can be used to replace a portion of the strong SCA, to obtain the same selectivity but using only about one third the normal amount of strong SCA.

The term "strong SCA" refers to aromatic carboxylic acid esters containing 8 to 40 carbon atoms. Specific examples of the esters are alkyl benzoates in which the alkyl group is a saturated or unsaturated hydrocarbon group usually containing 1 to 8 carbon atoms, preferably 1 to 4 carbon atoms, such as methyl benzoate, ethyl benzoate, n- or i-propyl benzoate, n-, i-, sec- or tert-butyl benzoate, n- or i-amyl benzoate, n-hexyl benzoate, n-octyl benzoate, 2-ethylhexyl benzoate, vinyl benzoate, and allyl benzoate (preferably methyl benzoate and ethyl benzoate); cycloalkyl benzoates in which the cycloalkyl group is a non-aromatic cyclic hydrocarbon group usually containing 3 to 8 carbon atoms, preferably 5 to 6 carbon atoms, such as cyclopentyl benzoate and cyclohexyl benzoate; aryl benzoates in which the aryl group is a hydrocarbon group usually containing 6 to 10 carbon atoms, preferably 6 to 8 carbon atoms in which halogen and/or an alkyl group with 1 to 4 carbon atoms may be bonded to the ring, such as phenyl benzoate, 4-tolyl benzoate, benzyl benzoate, styryl benzoate, 2-chlorophenyl benzoate, and 4-chlorobenzyl benzoate; aromatic monocarboxylic acid esters in which an electron-donating substituent, such as a member selected from halogens, alkoxy groups and alkyl groups, may be bonded to the aromatic ring; alkoxy benzoates in which the alkyl group constituting the alkoxy group is an alkyl group usually containing 1 to 4 carbon atoms, preferably methyl or ethyl, and the like and aryl groups in the ester are the same as described hereinabove, such as methyl anisate, ethyl anisate, i-propyl anisate, i-butyl anisate, phenyl anisate, benzyl anisate, ethyl o-methoxybenzoate, methyl p-ethoxybenzoate, ethyl p-ethoxybenzoate, n-butyl p-ethoxybenzoate, ethyl-p-allyloxybenzoate, phenyl p-ethoxybenzoate, methyl o-ethoxybenzoate, ethyl veratrate, and ethyl asym-guaiacolcarboxylate; alkylbenzoic acid esters in which the alkyl group attached to the aromatic ring of benzoic acid is a saturated or unsaturated hydrocarbon group usually containing 1 to 8 carbon atoms, and the alkyl and aryl groups of the ester are the same as mentioned hereinabove, such as methyl p-toluene, ethyl p-toluate, i-propyl p-toluate, n- or i-amyl toluate, allyl p-toluate, phenyl p-toluate, 2-tolyl p-toluate, ethyl o-toluate, ethyl m-toluate, methyl p-ethylbenzoate, ethyl p-ethylbenzoate, sec-butyl p-ethylbenzoate, i-propyl o-ethylbenzoate, n-butyl m-ethylbenzoate, ethyl 3,5-xylenecarboxylate, and ethyl p-styrenecarboxylate; halogen-substituted benzoic acid esters (in which the halogen is chlorine, bromine, or iodine, preferably chlorine), such as methyl chlorobenzoate, ethyl chlorobenzoate, n-butyl chlorobenzoate, and benzyl chlorobenzoate.

A preferred group of aromatic esters are represented by the general formula below where $R^2$ and $R^3$ are methyl or ethyl groups:

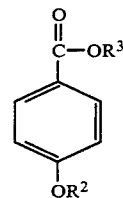

Much preferred esters are ethyl p-ethoxy benzoate (pEEB) and p-ethyl anisate (pEA), with pEEB being more preferred.

The term "weak SCA" refers to both simple ethers and tertiary amines (primary and secondary amines are not useful in this invention), with the simple ethers being preferred over the tertiary amines. Examples of simple ethers are those of the general formula R⁴—O—R⁵ where R⁴ and R⁵ are alkyl groups having 1 to 8 carbon atoms, preferably ethyl, n-butyl or iso-amyl. Preferred ethers are di-ethyl ether, di-n-butyl ether and di-iso-amyl ether, with di-ethyl ether being most preferred.

Tertiary amines are those of the general formula

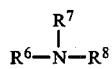

where R⁶, R⁷ and R⁸ are C₁ to C₈ alkyl groups, preferably methyl or ethyl groups. A preferred group of amines are trimethyl amine and triethylamine.

There are a number of aspects concerning the weak SCA that are of importance:

such electron donors do not react irreversibly with TEA under polymerization conditions; i.e., they simply form Lewis Acid-Lewis Base adducts.

sterically-hindered amines such as 2,2,6,6-tetramethylpiperidine or 2,6-lutidine (i.e., 2,6-di-t-butylpyridine) do not give the desired effect (see examples); i.e., they are incapable of achieving desired selectivity.

the weak SCA alone is not capable of giving the desired selectivity.

A preferred molar ratio of strong SCA to weak SCA is between 0.05 and 0.75, with the more preferred molar ratio being between 0.075 and 0.5.

The catalysts according to this invention have been shown to be of special advantage in the homo- or copolymerization of propylene. They are also of advantage in the polymerization of 1-butene and the copolymerization of 1-butene with small amounts of other alpha monoolefins.

The polymers produced with catalysts of this invention have the same utility as is known for polymers produced at the same conditions with other high activity catalysts. Moreover, the odor of the resulting polymers is not as strong an odor.

Olefin polymerization may be conducted as a solution process in which the polymer is produced as a solution in monomer or diluent. Polymerization of propylene as sole olefin feed or in combination with small amounts, e.g., from 1 to 20 mole percent, of ethylene, 1-butene or other alpha olefin comonomer may be conducted in a liquid system with an inert diluent such as a paraffinic liquid of 3 to 15 carbon atoms per molecule, or in a liquid system containing propylene as sole diluent or together with a small amount of propane, or in vapor phase or in fluidized bed gas-phase process. Propylene polymerization in liquid phase is conducted at temperatures of 50° to 80° C. and at a pressure sufficient to maintain liquid conditions.

In a continuous reaction system, the liquid in the reaction zone is maintained at reaction conditions, monomer is continuously charged to the reaction zone, catalyst components are also charged continuously or at frequent intervals to the reaction zone, and reaction mixture which contains polymer is withdrawn from the reaction zone continuously or at frequent intervals; polymer product is recovered from the withdrawn reaction mixture.

In propylene polymerization, the reaction mixture is typically maintained at conditions at which the polymer is produced as a slurry of powder in the reaction mixture. The catalyst systems of this invention are extremely active and highly stereoselective in propylene polymerization, so that no removal of catalyst components or of atactic polymer from the polymer product is required.

While the catalyst of this invention are particularly adapted for use in continuous polymerization systems, they may, of course, also be employed in batch polymerization. This may be of advantage in multistage polymerization, such as is known for production of propylene polymers with improved impact properties, in which propylene polymers and propylene-ethylene polymers are produced in separate reaction zones arranged in sequence.

The novel step which results in the advantages of this invention is the selection and use of the particular combination of SCA. The amount of total SCA employed is typically between about 0.5 and about 5.0 moles AlR′₃ cocatalyst to moles total SCA, preferably between about 0.6 and about 3.0 moles cocatalyst per mole total SCA.

In a continuous reaction system, the mixture of procatalyst and diluent is suitably prepared continuously in a flowing system designed for the desired contact time and all catalyst components are injected into the polymerization reaction zone continuously or at frequent intervals.

While it is possible to merely add the two SCAs as separate streams or as mixtures to the reaction zone, it is preferable to add the components in the following order:

first, the strong SCA is added;
second, the cocatalyst premixed with the weak SCA is added; and
third, the procatalyst is added.

In a continuous process it is preferred that the strong SCA be added separate from the weak SCA, which weak SCA is preferably mixed with the cocatalyst.

The total amount of aluminum alkyl compounds in the polymerization reaction mixture is generally in the range from about 10 to 200 moles per atom of titanium in the procatalyst and in most cases preferably between about 30 and 130.

Differently prepared procatalysts vary in the Al:Ti ratio required for best results, as will be known to persons familiar with this type of catalyst. In general, activity may be greater at higher Al:Ti ratios, but this results in higher aluminum residues of the undeashed polymer, which is undesirable; it also tends to increase the requirement of selectivity control agent in order to maintain the desired degree of isotacticity of the product, and the selectivity control agent generally also has the effect of reducing catalyst activity. The desired balance of concentration of catalyst components is readily determined by experiment.

It is well known that supported coordination procatalysts and catalyst systems of the type used herein are highly sensitive, in varying degrees, to catalyst poisons such as moisture, oxygen, carbon oxide, acetylenic compounds and sulfur compounds. It will be understood that in the practice of this invention, as well as in the following examples, both the equipment and the reagents and diluents are carefully dried and freed of potential catalyst poisons.

The productivity of the procatalyst is determined as kg polymer/g procatalyst in a standard one hour batch reaction; it may also be expressed as kg polymer/g Ti. Catalyst activity is sometimes reported as kg polymer/g procatalyst/hr. If determined in a standard one hour test, activity thus is numerically the same as productivity. However, supported coordination catalysts tend to exhibit a relatively rapid decrease in activity, so that the initial activity and the effective activity during the first 15–30 minutes of reaction may be significantly higher than activity determined in a one hour test.

The selectivity to isotactic polypropylene is determined by measuring the amount of xylene soluble polymer (XS), in accordance with regulations of the U.S. Food and Drug Administration. The XS test is carried out as follows: The sample is completely dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 20 ml aliquot of the filtrate, drying the residue under vacuum, and weighing the residue. The xylene-solubles consist of amorphous material with some low molecular weight crystalline material. (FDA regulations 121.2501 and 121.2510, 1971.) The numerical value of XS in the case of propylene homopolymer is typically about 2 percent less than the amount of polymers extractable in refluxing n-heptane. Thus the isotacticity index of polypropylene (amount insoluble in refluxing n-heptane) is approximately 100−(XS+2).

Catalyst productivity at standard conditions exhibits an inverse relationship with stereoselectivity. This relationship is characteristic for any given procatalyst. It is generally possible to control these variables, within limits, by changing the proportion of selectivity control agent. Increasing the amount of SCA increases selectivity to isotactic or stereoregular polymer but reduced activity, and hence productivity in a standard one hour test. The relationship in propylene polymerization is such that a decrease of 1% of XS, e.g., from 5 to 4, corresponds approximately to a decrease in activity of 5 kg/g/hr.

The following examples illustrate the invention:

EXAMPLES

The Procatalysts

In the following examples, the procatalysts were composites of tetravalent titanium, magnesium, chloride, ethoxy groups and ethyl benzoate. The resulting solids were highly active and selective procatalysts in propylene polymerization.

Propylene Polymerization

Unless otherwise stated, propylene polymerization was conducted as follows:

About 1400 gm of liquid propylene and 132 mmol of hydrogen in a one gallon (about 4 liter) autoclave equipped with an agitator, was heated to 60° C. under sufficient pressure to maintain it in liquid phase. A predetermined amount of the strong SCA was added to the reactor. Then a mixture of the weak SCA and 2.5 ml (0.7 mmol) of triethyl aluminum (TEA) as a 5% solution in $C_7$–$C_8$ paraffin diluent were added. To the agitated mixture there was added a sufficient amount of the slurry of procatalyst in mineral oil to provide a TEA to Ti ratio of 70:1.

The mixture was agitated and maintained at 67° C. for one hour. The pressure was then released and the powdered polypropylene recovered.

The particular SCA used, amounts and results are presented below in Table 1:

TABLE 1

| Run # | Strong Electron Donor, A (TEA/A mol ratio) | Weak Electron Donor, B (TEA/B mol ratio) | Yield kg/cat | Xylene Solubles % w | ppm Ester (A) in product |
|---|---|---|---|---|---|
| B-733 | ethylbenzoate (4.0) | diethylether (1.0) | 26.2 | 3.8 | 55 |
| C-606 (Comparison) | ethylbenzoate (2.0) | — | 18.6 | 3.7 | 163 |
| A-576 | paraethylanisate (12.0) | di-n-butylether (1.0) | 37.5 | 4.9 | 24 |
| A-717 (Comparison) | paraethylanisate (2.5) | — | 36.5 | 4.8 | 160 |
| A-579 | paraethylanisate (12.0) | di-n-butylether (1.0) | 49.5 | 6.0 | 16 |
| B-498 (Comparison) | paraethylanisate (3.2) | — | 43.7 | 6.2 | 56 |
| A-670 | paraethylanisate (6.0) | diethylether (1.0) | 32.2 | 3.6 | 38 |
| F-378 (Comparison) | paraethylanisate (12.0) | 2,2,6,6-tetramethyl piperidine (0.93) | 46.3 | 12.3 | |
| H-153 (Comparison) | paraethylanisate (12.0) | 2,6-lutidine (0.74) | 15.7 | 12.5 | |

As shown by comparing Run B-733 against C-606, by comparing Run A-576 against A-717 and by comparing Run A-579 against B-498, it is possible by using a combination of strong and weak SCA to obtain polymers having equivalent xylene solubles, but at a higher yield (kg polymer per g catalyst) and at a much lower ester level in the resulting polymer. The lower ester level is very desirable in view of the undesired odor effect of the ester. Runs F-378 and H-153 also show that sterically hindered amines are not useful and result in polymers having unacceptably high xylene solubles levels.

What is claimed is:

1. In the polymerization of an alpha-monoolefin feed comprising at least about 80 mole percent propylene or butene-1, in which the catalyst system comprises:
   (a) a highly active solid catalyst component comprising titanium tetrachloride, magnesium chloride and an aromatic ester electron donor,
   (b) as cocatalyst a compound $AlR'_3$ where $R'$ represents an alkyl group of 2 to 8 carbon atoms, and
   (c) a selectivity control agent which may be partly or totally complexed with the cocatalyst,
the improvement wherein said selectivity control agent comprises a strong selectivity control agent and a weak selectivity control agent, said strong selectivity control agent being an aromatic carboxylic acid ester containing 8 to 40 carbon atoms and said weak selectivity control agent being selected from the group consisting of simple ethers and tertiary amines, wherein said simple ethers have the general formula $R^4\text{---}O\text{---}R^5$ where $R^4$ and $R^5$ are selected from the group consisting of $C_1$ to $C_8$ alkyl groups, and said tertiary amine has the general formula

where $R^6$, $R^7$ and $R^8$ are selected from the group consisting of $C_1$ to $C_8$ alkyl groups.

2. The polymerization of claim 1 wherein the molar ratio of strong selectivity control agent to weak selectivity control agent is between 0.05 and 0.75.

3. The polymerization of claim 1 wherein the molar ratio of cocatalyst to the total of strong plus weak selectivity control agent is between about 0.5 and about 5.0.

4. The polymerization of claim 1 wherein said solid catalyst component has the composition

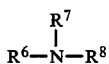

wherein
R is an alkyl group of 2–8 carbon atoms or an aryl or arylalkyl group of 6 to 20 carbon atoms,
ED is an electron donor,
x = 5–40
y = 10–100
z = 0.02–1.0 and
a = 0.5–10.

5. The polymerization of claim 4 wherein said electron donor is ethyl benzoate.

6. The polymerization of claim 1 wherein said cocatalyst is triethyl aluminum.

7. The polymerization of claim 1 wherein said strong selectivity control agent is an alkoxy benzoate.

8. The polymerization of claim 1 wherein said strong selectivity control agent has the general formula

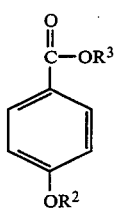

where $R^2$ and $R^3$ are selected from the group consisting of methyl and ethyl groups.

9. The polymerization of claim 1 wherein said strong selectivity control agent is p-ethyl anisate.

10. The polymerization of claim 1 wherein said strong selectivity control agent is ethyl p-ethoxybenzoate.

11. The polymerization of claim 1 wherein said weak selectivity control agent is selected from the group consisting of di-ethyl ether, di-n-butyl ether and di-iso-amyl ether.

12. The polymerization of claim 1 wherein said weak selectivity control agent is di-ethyl ether.

13. The polymerization of claim 9 wherein said weak selectivity control agent is di-ethyl ether.

14. The polymerization of claim 10 wherein said weak selectivity control agent is di-ethyl ether.

15. The polymerization of claim 1 wherein said weak selectivity control agent is mixed with said cocatalyst and said strong selectivity control agent is added separately.

16. The polymerization of claim 15 wherein said cocatalyst is triethyl aluminum, said strong selectivity control agent is an alkoxy benzoate, and said weak selectivity control agent is a simple ether of the general formula $R^4\text{---}O\text{---}R^5$ where $R^4$ and $R^5$ are selected from the group consisting of $C_1$ to $C_8$ alkyl groups.

17. The polymerization of claim 16 wherein said strong selectivity control agent is selected from the group consisting of p-ethyl anisate and ethyl-p-ethoxybenzoate and said weak selectivity control agent is selected from the group consisting of di-ethyl ether, di-n-butyl ether and di-iso-amyl ether.

18. The polymerization according to claim 1 wherein $R^6$, $R^7$ and $R^8$ are selected from methyl and ethyl groups.

19. The polymerization according to claim 1 wherein said strong selectivity control agent is capable of reaction with said cocatalyst to form a reaction product and said weak selectivity control agent is not capable of reacting irreversibly with said cocatalyst.

20. The polymerization according to claim 1 wherein said alpha-monoolefin feed comprises at least about 80 mole percent propylene.

21. The polymerization according to claim 1 wherein said alpha-monoolefin feed is propylene.

22. The polymerization according to claim 16 wherein said alpha-monoolefin feed comprises at least 80 mole percent propylene.

23. The polymerization according to claim 16 wherein said alpha-monoolefin feed is propylene.

24. The polymerization according to claim 17 wherein said alpha-monoolefin feed is propylene.

25. The polymerization according to claim 2 wherein the amount of cocatalyst employed is between about 10 and about 200 moles $AlR'_3$ per atom of titanium in said solid catalyst component and between about 0.5 and about 5.0 moles $AlR'_3$ per mole total selectivity control agent.

* * * * *